United States Patent
Shibuno

(10) Patent No.: US 11,924,549 B2
(45) Date of Patent: *Mar. 5, 2024

(54) IMAGING APPARATUS

(71) Applicant: Panasonic Intellectual Property Management Co., Ltd., Osaka (JP)

(72) Inventor: Koji Shibuno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 790 days.

This patent is subject to a terminal disclaimer.

(21) Appl. No.: 16/957,826

(22) PCT Filed: Jun. 27, 2019

(86) PCT No.: PCT/JP2019/025675
§ 371 (c)(1),
(2) Date: Jun. 25, 2020

(87) PCT Pub. No.: WO2020/261499
PCT Pub. Date: Dec. 30, 2020

(65) Prior Publication Data
US 2023/0102114 A1    Mar. 30, 2023

(51) Int. Cl.
*H04N 23/67* (2023.01)
*G02B 7/09* (2021.01)
*G03B 13/36* (2021.01)

(52) U.S. Cl.
CPC .......... *H04N 23/673* (2023.01); *G02B 7/09* (2013.01); *G03B 13/36* (2013.01)

(58) Field of Classification Search
CPC ........ H04N 23/673; H04N 23/60; G02B 7/09; G02B 7/38; G02B 7/365; G02B 7/102; G02B 7/36; G03B 13/36
See application file for complete search history.

(56) References Cited

U.S. PATENT DOCUMENTS

| 7,324,151 B2 | 1/2008 | Onozawa |
| 9,251,571 B2 | 2/2016 | Tay |

(Continued)

FOREIGN PATENT DOCUMENTS

| CN | 103261939 A | 8/2013 |
| JP | H10-026526 A | 1/1998 |

(Continued)

OTHER PUBLICATIONS

Extended European Search Report for corresponding European Application No. 20181381.3 dated Oct. 30, 2020.

(Continued)

*Primary Examiner* — Shahbaz Nazrul
(74) *Attorney, Agent, or Firm* — Renner, Otto, Boisselle & Sklar, LLP

(57) ABSTRACT

An imaging apparatus includes an imager, and a controller. The imager is configured to capture a subject image formed via an optical system including a focus lens, to generate image data. The controller is configured to control a focusing operation for adjusting a position of the focus lens along an optical axis in the optical system according to an evaluation value for a focus state. In response to an instruction to reduce or increase a distance to a subject to be focused, the controller is operable to shift a start position to a direction according to the instruction in directions along the optical axis, the start position being a position of the focus lens for starting the focusing operation. The controller is operable to start the focusing operation from the start position after the shift.

10 Claims, 10 Drawing Sheets

(56) References Cited

U.S. PATENT DOCUMENTS

| | | | |
|---|---|---|---|
| 9,477,138 B2* | 10/2016 | Brunner | H04N 23/62 |
| 2004/0036792 A1 | 2/2004 | Moriya et al. | |
| 2005/0189419 A1* | 9/2005 | Igarashi | H04N 23/635 |
| | | | 348/E5.045 |
| 2006/0171699 A1 | 8/2006 | Nakai | |
| 2008/0055457 A1 | 3/2008 | Nakahara | |
| 2008/0122939 A1* | 5/2008 | Hirai | H04N 23/61 |
| | | | 348/222.1 |
| 2009/0059057 A1 | 3/2009 | Long et al. | |
| 2009/0115883 A1 | 5/2009 | Tsuchiya | |
| 2013/0250165 A1 | 9/2013 | Hamada | |
| 2013/0293766 A1 | 11/2013 | Sugimoto | |
| 2016/0103830 A1 | 4/2016 | Cheong et al. | |
| 2017/0230568 A1 | 8/2017 | Yamaguchi | |
| 2017/0264819 A1 | 9/2017 | Okamoto | |
| 2017/0347017 A1* | 11/2017 | Ito | G02B 7/36 |
| 2018/0172949 A1 | 6/2018 | Oogami | |
| 2019/0394409 A1 | 12/2019 | Matsumoto | |

FOREIGN PATENT DOCUMENTS

| | | | |
|---|---|---|---|
| JP | 2000-121918 A | 4/2000 | |
| JP | 2001-166200 A | 6/2001 | |
| JP | 2001-208963 A | 8/2001 | |
| JP | 2004-093776 A | 3/2004 | |
| JP | 2004-264635 A | 9/2004 | |
| JP | 2005-269604 A | 9/2005 | |
| JP | 2006-259688 A | 9/2006 | |
| JP | 2009-115921 A | 5/2009 | |
| JP | 2014-056153 A | 3/2014 | |
| JP | 2015-026880 A | 2/2015 | |
| JP | 2017-143504 A | 8/2017 | |
| JP | 2019-041178 A | 3/2019 | |

OTHER PUBLICATIONS

Office Action for corresponding Chinese Application No. 201980006992.X dated Apr. 27, 2022 and its English Machine Translation.

Official Communication for corresponding European Application No. 20181381.3 dated Jun. 1, 2022.

Office Action for related U.S. Appl. No. 16/911,496, dated Apr. 1, 2021.

Office Action for related U.S. Appl. No. 16/911,464, dated Apr. 2, 2021.

Extended European Search Report for corresponding European Application No. 19906595.4 dated Dec. 21, 2020.

Office Action for related Japanese Application No. 2019-120392 dated Jan. 10, 2023 and its English Machine Translation.

Office Action from related U.S. Appl. No. 16/911,464, dated Sep. 20, 2021.

Office Action from related U.S. Appl. No. 16/911,496, dated Sep. 24, 2021.

Office Action from related U.S. Appl. No. 16/911,464 dated Jun. 15, 2022.

International Preliminary Report on Patentability of related International Application No. PCT/JP2019/025675 dated Dec. 28, 2021 (English translation).

Office Action from related U.S. Appl. No. 16/911,464 dated Jan. 6, 2022.

Office Action for related Japanese Application No. 2019-120395 dated Feb. 7, 2023 and its English Machine Translation.

English language Translation of the Written Opinion of the International Searching Authority for corresponding Application No. PCT/JP2019/025675, dated Sep. 24, 2019.

International Search Report for corresponding International Application No. PCT/JP2019/025675 dated Sep. 24, 2019, English translation.

Related U.S. Appl. No. 16/911,464, filed Jun. 25, 2020.

Related U.S. Appl. No. 16/911,496, filed Jun. 25, 2020.

International Search Report for corresponding Application No. PCT/JP2019/025675, dated Sep. 24, 2019.

Office Action for related Japanese Application No. 2019-120395 dated Apr. 25, 2023 and its English Machine Translation.

Office Action for related Japanese Application No. 2019-120395 dated Jul. 18, 2023 and its English Machine Translation.

Office Action for related Chinese Application No. 202010594216.0 dated Sep. 14, 2023 and its English Machine Translation.

* cited by examiner

NEAR SHIFT

FAR SHIFT

IMAGING APPARATUS

TECHNICAL FIELD

The present disclosure relates to an imaging apparatus that performs a focusing operation.

BACKGROUND ART

Patent Document 1 discloses an automatic focusing device that aims to shorten AF time without causing background focusing with respect to autofocus (AF) technology used in digital still cameras, digital video cameras, and the like. This automatic focusing device performs a scanning operation for acquiring a focus evaluation value from an image signal obtained by moving a focus lens in the optical axis direction. During the move of the focus lens to a start position of the scanning operation from an initial position in the optical axis direction, when the automatic focusing device detects a peak position in a zone next to a zone including the initial position, the automatic focusing device reverses a moving direction of the focus lens. In this case, the focus lens is moved to the peak position without performing the scanning operation.

CITATION LIST

Patent Document

Patent Document 1: Japanese Patent Laid-Open No. 2014-056153

SUMMARY OF INVENTION

Technical Problem

The present disclosure provides an imaging apparatus capable of easily focusing on a desired subject.

Solution to Problem

The imaging apparatus according to the present disclosure includes an imager and a controller. The imager is configured to capture a subject image formed via an optical system including a focus lens, to generate image data. The controller is configured to control a focusing operation for adjusting the position of the focus lens along the optical axis in the optical system according to the evaluation value for the focus state. In response to an instruction to reduce or increase a distance to a subject to be focused, the controller is operable to shift a start position to a direction according to the instruction in directions along the optical axis, the start position being a positon of the focus lens for starting the focusing operation. The controller is operable to start the focusing operation from the start position after the shift.

According the imaging apparatus of the present disclosure, it is possible to easily focus on a desired subject.

DESCRIPTION OF EMBODIMENTS

Hereinafter, embodiments of the present disclosure will be described with reference to the drawings as appropriate. However, in the detailed description, unnecessary portions of the description related to the prior art and substantially the same configuration may be omitted. This is to simplify the explanation. Also, the following description and the accompanying drawings are disclosed to enable those skilled in the art to fully understand the present disclosure, and are not intended to limit the subject matter of the claims.

First Embodiment

Hereinafter, the configuration and operation of a digital camera that is an embodiment of an imaging apparatus according to the present disclosure will be described.

1. Configuration

Figure 1:
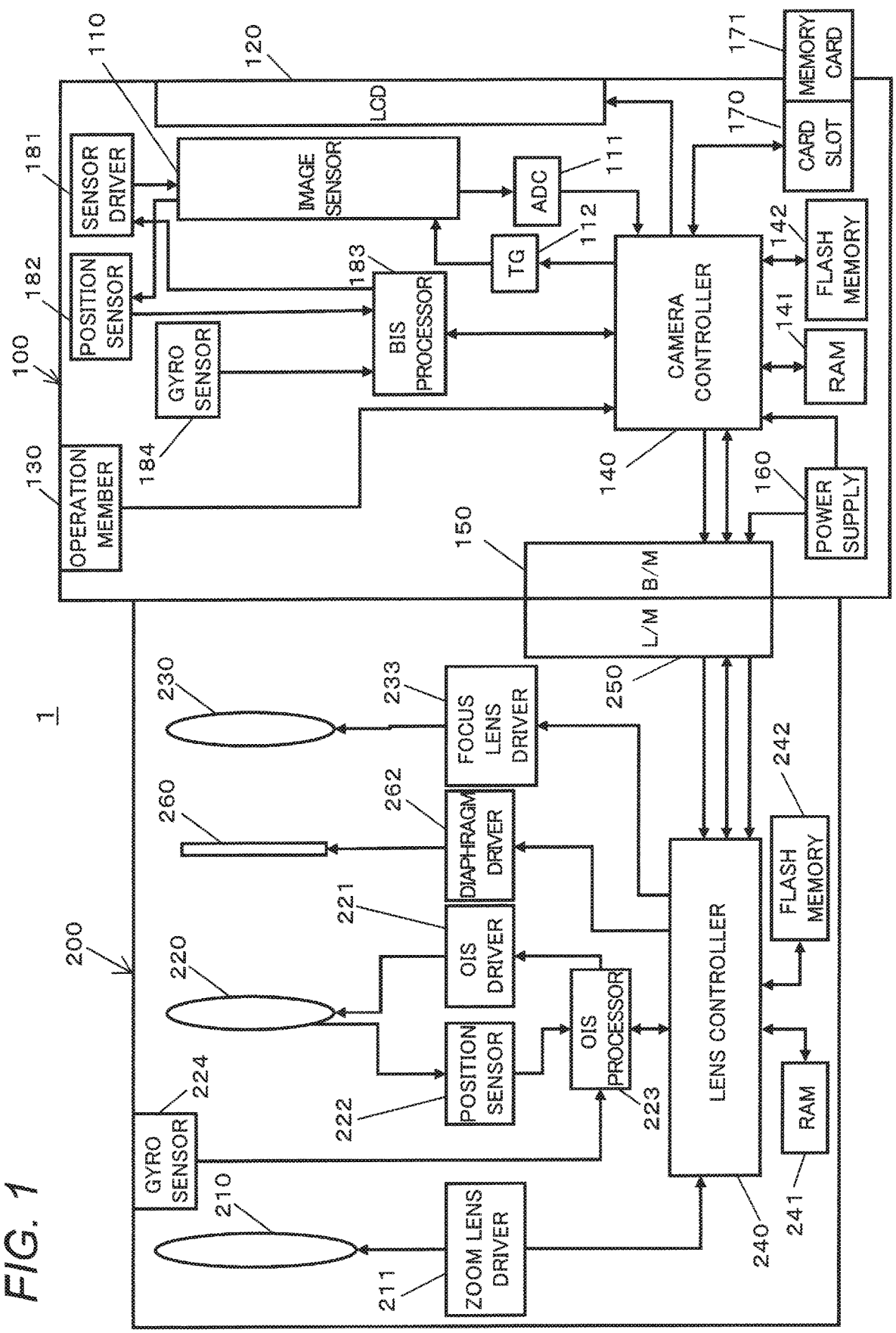
FIG. 1 is a block diagram illustrating a configuration of a digital camera according to a first embodiment of the present disclosure.

FIG. 1 is a block diagram illustrating a configuration of a digital camera 1 according to the first embodiment. The digital camera 1 according to this embodiment includes camera body 100 and an interchangeable lens 200 that can be attached to and detached from the camera body 100.

1-1. Camera Body

The camera body 100 (an example of an imaging apparatus) includes an image sensor 110, a liquid crystal monitor 120, an operation member 130, a camera controller 140, a body mount 150, a power supply 160, and a card slot 170.

The camera controller 140 controls the whole operation of the digital camera 1 by controlling components such as the image sensor 110 in accordance with an instruction from the operation member 130. The camera controller 140 trans a vertical synchronization signal to a timing generator 112. In parallel with this, the camera controller 140 generates an exposure synchronization signal. The camera controller 140 periodically transmits the generated exposure synchronization signal to a lens controller 240 via the body mount 150 and a lens mount 250. The camera controller 140 uses a RAM 141 as a work memory during control operations and image processing operations.

The image sensor 110 is a device that captures a subject image incident via the interchangeable lens 200 and generates image data. The image sensor 110 is a CMOS image sensor, for example. The generated image data is digitized by an AD converter 111. The digitized image data is subjected to predetermined image processing by the camera controller 140. The predetermined image processing includes, for example, gamma correction processing, white balance correction processing, defect correction processing, YC conversion processing, electronic zoom processing, and JPEG compression processing. The image sensor 110 may be a CCD or NMOS image sensor.

The image sensor 110 operates at a timing controlled by the timing generator 112. The image sensor 110 generates a still image, a moving image, or a through image for recording. The through image is mainly a moving image, and is displayed on the liquid crystal monitor 120 in order for a user to determine a composition for capturing a still image.

The liquid crystal monitor 120 displays an image such as a through image and various information such as a menu screen. Instead of the liquid crystal monitor, other types of display devices, for example, organic EL display devices may be used.

The operation member 130 includes various operation members such as a release button for instructing start of shooting, a mode dial for setting a shooting mode, and a power switch. The operation member 130 in the camera body 100 is illustrated in FIG. 2.

Figure 2:
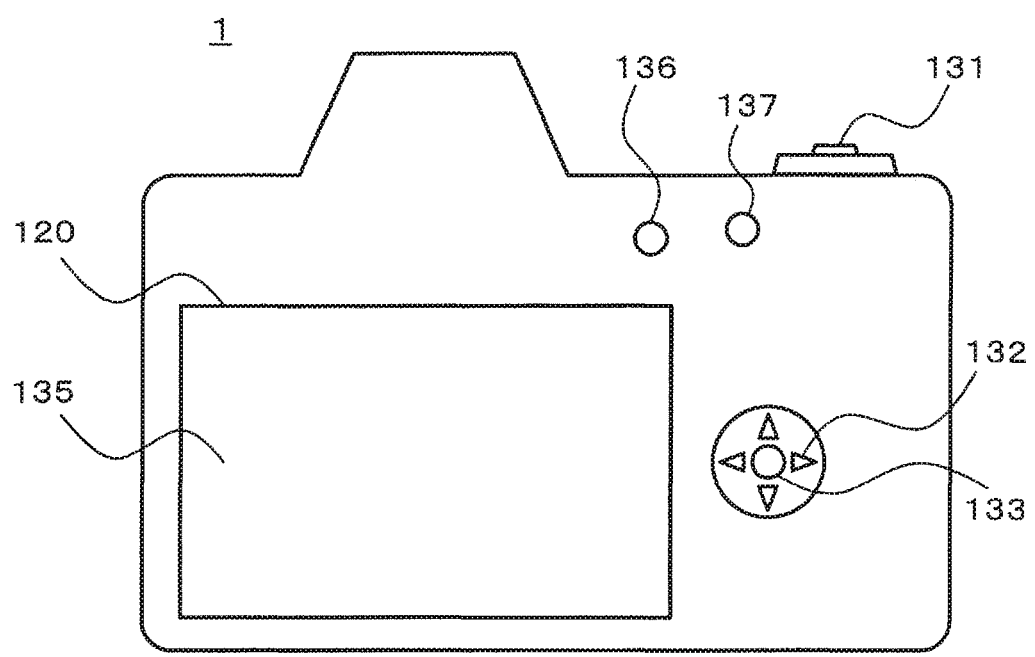
FIG. 2 is a view showing the back of the digital camera.

FIG. 2 is a view showing the back of the digital camera 1. FIG. 2 shows, as an example of the operation member 130, a release button 131, a selection button 132, a determination button 133, a touch panel 135, and a plurality of function buttons 136 and 137 (hereinafter referred to as "Fn buttons"). The operation member 130, when receiving an operation by the user, transmits various instruction signals to the camera controller 140.

The release button 131 is a two-stage depression type button. When the release button 131 is half-pressed by the user, the camera controller 140 executes autofocus control (AF control), auto exposure control (AE control), and like. When the release button 131 is fully pressed by the user, the camera controller 140 records the image data captured at the timing of the pressing operation as a recorded image in a memory card 171 or the like.

The selection button 132 is a depression type button provided in the up/down/left/right directions. The user can select various condition items displayed on the liquid crystal monitor 120 or move a cursor by depressing one of the selection buttons 132 in the up/down/left/right directions.

The determination button 133 is a depression type button. When the determination button 133 is depressed by the user while the digital camera 1 is in the shooting mode or a playback mode, the camera controller 140 displays a menu screen on the liquid crystal monitor 120. The menu screen is a screen for setting various conditions for shooting/playback. When the determination button 133 is depressed when a setting item for various conditions is selected, the camera controller 140 determines the setting of the selected item.

The touch panel 135 is arranged so as to overlap with the display screen of the liquid crystal monitor 120, and detects a touch operation on the display screen by the user's finger. As a result, the user can perform operations such as designation of an area for the image displayed on the liquid crystal monitor 120.

Fn buttons 136 and 137 are depression type buttons. Each of the Fn buttons 136 and 137 can be assigned a user-desired function such as a near/far shift function, which will be described later, by setting on the menu screen, for example.

Returning to FIG. 1, the card slot 170 enables the memory card 171 to attach therewith and controls the memory card 171 based on the control from the camera controller 140.

The digital camera 1 can store image data in the memory card 171 and can read image data from the memory card 171.

The power supply 160 is a circuit that supplies power to each element in the digital camera 1.

The body mount 150 can be mechanically and electrically connected to the lens mount 250 of the interchangeable lens 200. The body mount 150 can transmit and receive data to and from the interchangeable lens 200 via the lens mount 250. The body mount 150 transmits the exposure synchronization signal received from the camera controller 140 to the lens controller 240 via the lens mount 250. Also, other control signals received from the camera controller 140 are transmitted to the lens controller 240 via the lens mount 250. The body mount 150 transmits a signal received from the lens controller 240 via the lens mount 250 to the camera controller 140. The body mount 150 supplies power from the power supply 160 to the whole interchangeable lens 200 via the lens mount 250.

In addition, the camera body 100 further includes, as a configuration to realize a BIS function (function to correct camera shake by shifting the image sensor 110), a gyro sensor 184 (blur detector) that detects a blur of the camera body 100 and a BIS processor 183 that controls blur correction processing based on the detection result of the gyro sensor 184. The camera body 100 furthermore includes a sensor driver 181 that moves the image sensor 110 and a position sensor 182 that detects the position of the image sensor 110.

The sensor driver 181 can be realized by a magnet and a flat coil, for example. The position sensor 182 is a sensor that detects the position of the image sensor 110 in a plane perpendicular to the optical axis of the optical system. The position sensor 182 can be realized by a magnet and a Hall element, for example.

The BIS processor 183 controls the sensor driver 181 based on a signal from the gyro sensor 184 and a signal from the position sensor 182 to shift the image sensor 110 in a plane perpendicular to the optical axis so as to cancel the blur of the camera body 100. A range in which the image sensor 110 can be driven by the sensor driver 181 is mechanically limited. A range in which the image sensor 110 can be mechanically driven is referred to as a "drivable range".

1-2. Interchangeable Lens

The interchangeable lens 200 includes an optical system, a lens controller 240, and a lens mount 250. The optical system includes a zoom lens 210, an OIS (Optical Image Stabilizer) lens 220, a focus lens 230, and a diaphragm 260.

The zoom lens 210 is a lens for changing the magnification of a subject image formed by the optical system. The zoom lens 210 is composed of one or more lenses. The zoom lens 210 is driven by a zoom lens driver 211. The zoom lens driver 211 includes a zoom ring that can be operated by the user. Alternatively, the zoom lens driver 211 may include a zoom lever and an actuator or a motor. The zoom lens driver 211 moves the zoom lens 210 along the optical axis direction of the optical system in accordance with an operation by the user.

The focus lens 230 is a lens for changing the focus state of the subject image formed on the image sensor 110 by the optical system. The focus lens 230 is composed of one or more lenses. The focus lens 230 is driven by a focus lens driver 233.

The focus lens driver 233 includes an actuator or a motor, and moves the focus lens 230 along the optical axis of the optical system based on the control of the lens controller

240. The focus lens driver 233 can be realized by a DC motor, a stepping motor, a servo motor, an ultrasonic motor, or the like.

The OIS lens 220 is a lens for correcting a blur of a subject image formed by the optical system of the interchangeable lens 200 in an OIS function (function to correct camera shake by shifting the OIS lens 220). The OIS lens 220 moves in a direction that cancels out the blur of the digital camera 1, thereby reducing the blur of the subject image on the image sensor 110. The OIS lens 220 is composed of one or more lenses. The OIS lens 220 is driven by an OIS driver 221.

Under the control of an OIS processor 223, the OTS driver 221 shifts the OIS lens 220 in a plane perpendicular to the optical axis of the optical system. A range in which the OIS lens 220 can be driven by the OIS driver 221 is mechanically limited. This is referred to as a range (drivable range) in which the OIS lens 220 can be mechanically driven by the OIS driver 221. The OIS driver 221 can be realized by a magnet and a flat coil, for example. A position sensor 222 is a sensor that detects the position of the OIS lens 220 in a plane perpendicular to the optical axis of the optical system. The position sensor 222 can be realized by a magnet and a Hall element, for example. The OIS processor 223 controls the OIS driver 221 based on the output of the position sensor 222 and the output of a gyro sensor 224 (blur detector).

The diaphragm 260 adjusts the amount of light incident on the image sensor 110. The diaphragm 260 is driven by a diaphragm driver 262, and the size of the opening is controlled. The diaphragm driver 262 includes a motor or an actuator.

The gyro sensor 184 or 224 detects a blur (vibration) in a yawing direction and a pitching direction based on the change in angle per unit time of the digital camera 1, that is, an angular velocity. The gyro sensor 184 or 224 outputs an angular velocity signal indicating the detected blur amount (angular velocity) to the BIS processor 183 or the OIS processor 223. The angular velocity signal output by the gyro sensor 184 or 224 may include a wide range of frequency components due to camera shake, mechanical noise, or the like. Instead of the gyro sensor, another sensor that can detect the blur of the digital camera 1 can also be used.

The camera controller 140 and the lens controller 240 may be configured by a hard-wired electronic circuit or a microcomputer using a program. For example, the camera controller 140 and the lens controller 240 can be realized by a processor such as a CPU, MPU, GPU, DSP, FPGA, or ASIC.

2. Operation

The operation of the digital camera 1 configured as described above will be described below.

For example, the digital camera 1 can operate in a live view mode, when the interchangeable lens 200 is attached to the camera body 100 and the operation for preparing for shooting is completed. The live view mode is an operation mode in which the image sensor 110 sequentially displays the image indicated by the generated image data on the liquid crystal monitor 120 as a through image.

In the operation for preparing for shooting, the camera controller 140 acquires lens data, AF data, and the like from the lens controller 240 via data communication between the camera body 100 and the interchangeable lens 200. The lens data is data indicating characteristic values specific to the interchangeable lens 200 such as a lens name, an F number, and a focal length. The AF data is data necessary for operating autofocus, and includes, for example, at least one of focus drive speed, focus shift amount, image magnification, and contrast AF availability information. Each piece of these data is stored in a flash memory 242 in advance.

In the live view mode, since the through image is displayed as a moving image on the liquid crystal monitor 120, the user can determine a composition for capturing a still image while viewing the liquid crystal monitor 120. The user can select whether or not to set the live view mode. For example, instead of the live view mode, an operation mode for displaying an image in an electronic viewfinder (not shown) may be used. Hereinafter, an example in which the live view mode is used will be described.

2-1. Near/Far Shift Function

The digital camera 1 of the present embodiment provides a near/far shift function, which is a function for reducing or increasing a distance to a subject to be autofocused based on, for example, a user operation. The near/far shift function will be described with reference to FIGS. 3A to 4B.

Figure 3A:
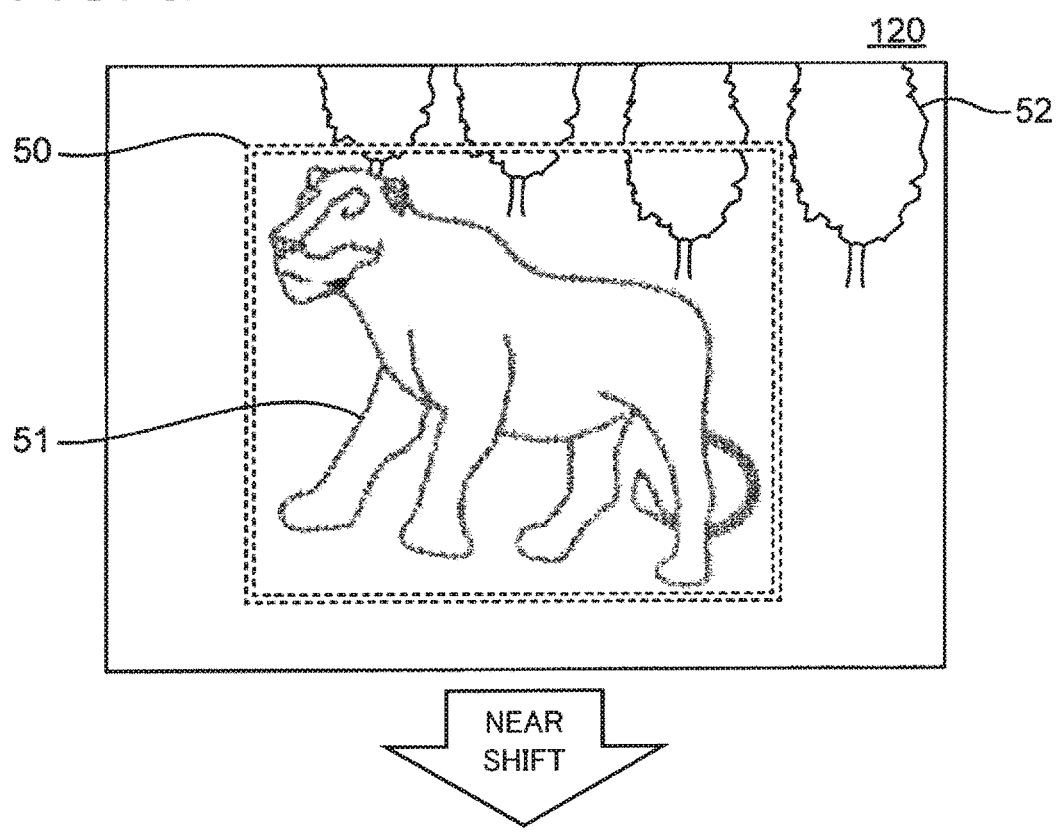
FIG. 3A is a diagram illustrating a focus state in which the background of a subject is focused in the digital camera.
Figure 3B:
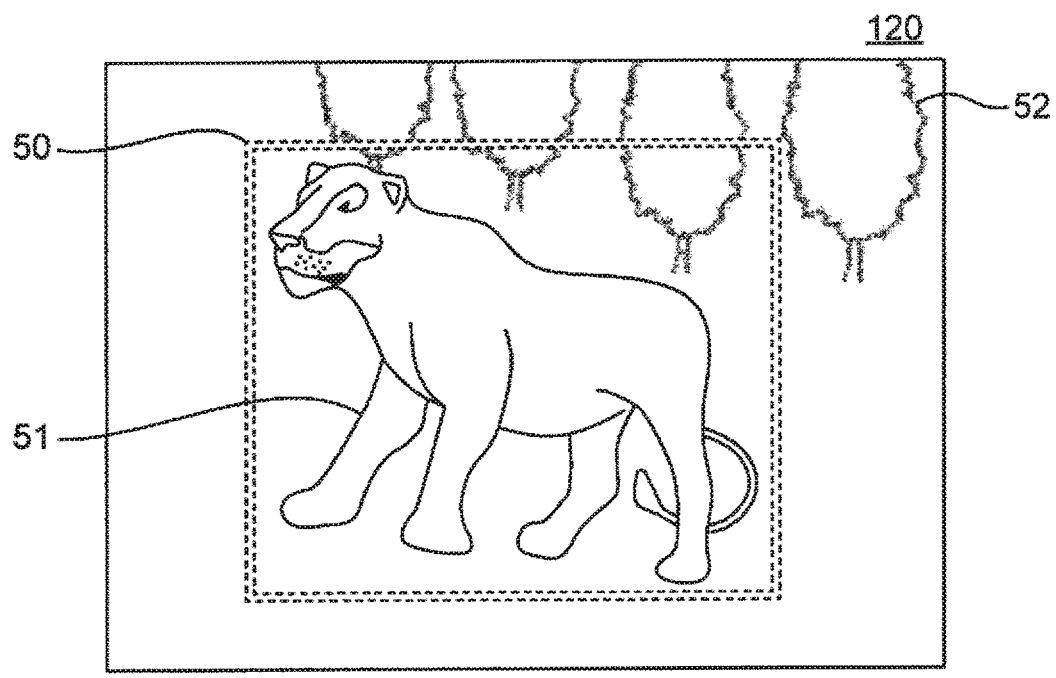
FIG. 3B is a diagram illustrating a focus state after a near-shift operation from the situation of FIG. 3A.

FIGS. 3A and 3B are diagrams for explaining the near shift function in the digital camera 1 of the present embodiment.

FIG. 3A illustrate a focus state in which the digital camera 1 is focused on a background 52 of a subject 51. For example, such a focus state is assumed when the user operates the autofocus of the digital camera 1 by half-depressing the release button 131 while viewing the liquid crystal monitor 120 in the live view mode.

In the example of FIG. 3A, the desired subject 51 and the background 52, which is at a distance farther than the distance to the subject 51, are included in the range of an AF area 50. The AF area 50 is an area that is detected as a target to be focused in the captured image during the autofocus operation, and is appropriately set in the digital camera 1. In this example, the desired subject 51 is not in focus but the background 52 in the AF area 50 is focused due to the autofocus.

According to the near shift function of the present embodiment in the above situation, the digital camera 1 receives an instruction for reducing a distance to the subject to be focused. Hereinafter, a user operation indicating such an instruction is referred to as a "near shift operation". FIG. 3B illustrates a focus state after the near shift operation is input from the situation of FIG. 3A.

Figure 4A:
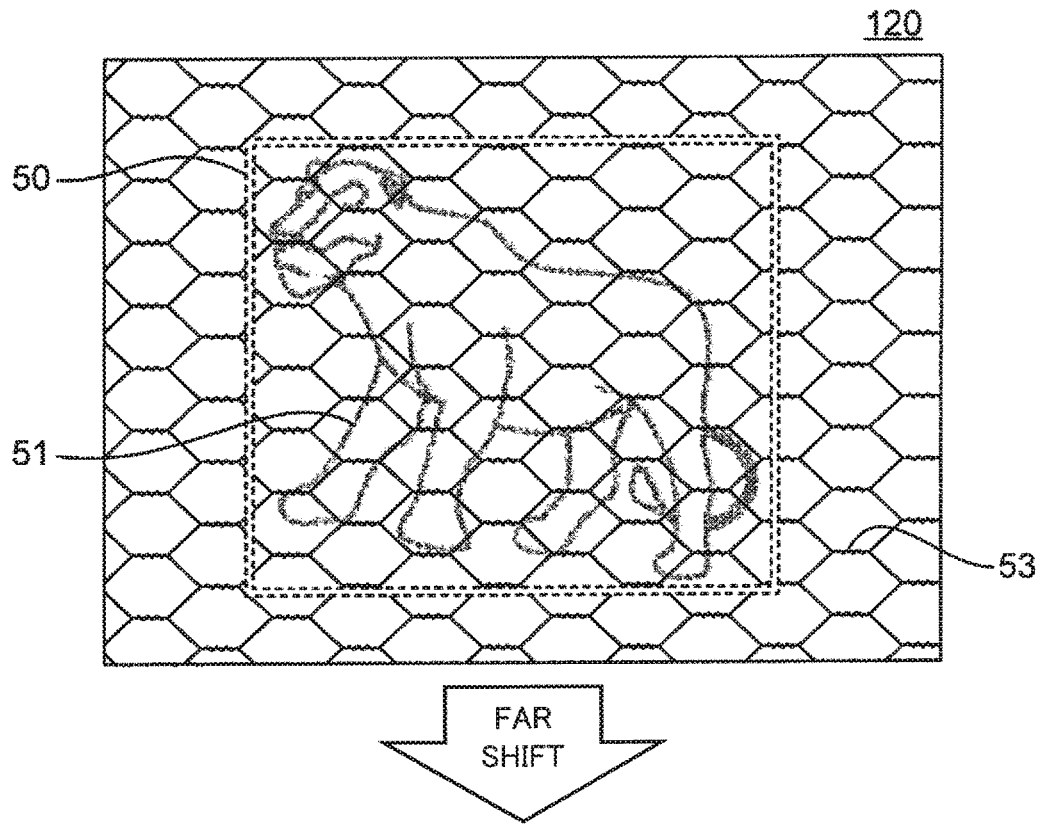
FIG. 4A is a diagram illustrating a focus state in which an obstacle to a subject is focused in the digital camera.
Figure 4B:
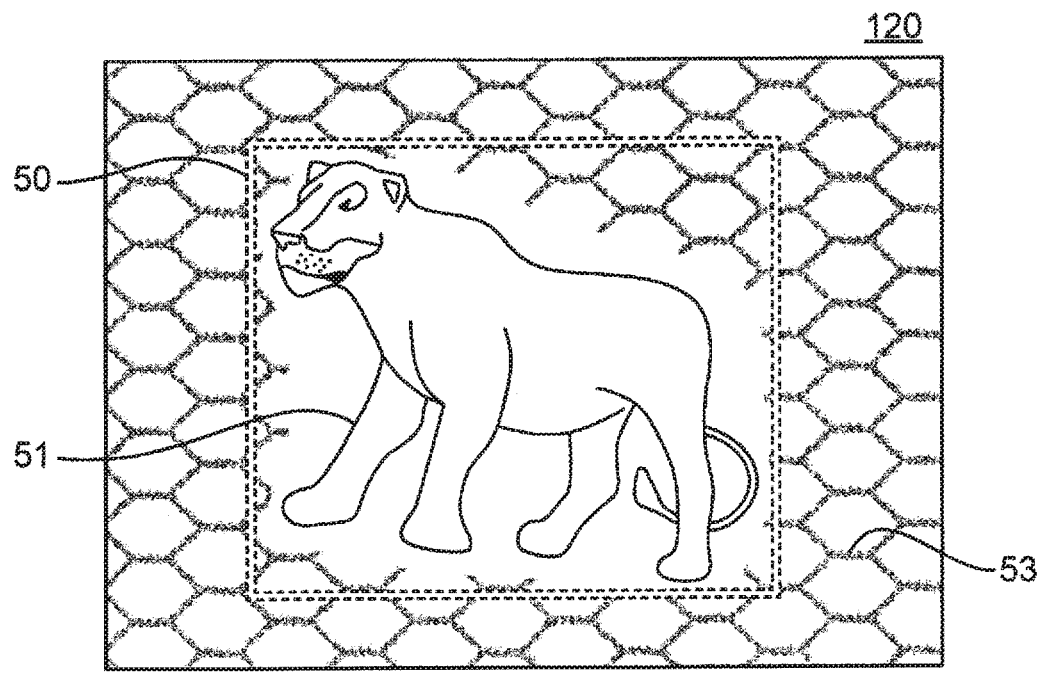
FIG. 4B is a diagram illustrating a focus state after a far shift operation is input from the situation of FIG. 4A.

FIGS. 4A and 4B are diagrams for explaining the far shift function in the digital camera 1 of the present embodiment.

FIG. 4A illustrates a focus state in which the obstacle 53 to the subject 51 is focused. In this example, the desired subject 51 and the obstacle 53 (such as a fence), which is closer than the distance to the subject 51, are included in the range of the AF area 50. In this example, the desired subject 51 is not in focus but the obstacle 53 in the AF area 50 is in focus due to the autofocus.

According to the far shift function of the present embodiment in the above situation, the digital camera 1 receives an instruction to increase the distance to the subject to be focused. Hereinafter, a user operation indicating such an instruction is referred to as a "far shift operation". FIG. 4B illustrates a focus state after the far shift operation is input from the situation of FIG. 4A.

As shown in FIGS. 3B and 4B, the near/far shift function of the present embodiment makes it possible to focus on the subject 51 intended by the user, even in a situation where the digital camera 1 has the background 52, the obstacle 53 or the like that could be an obstacle to focusing on the subject 51 during autofocus.

The digital camera 1 of the present embodiment realizes the near/far shift function as described above by simple control for starting autofocus after shifting the position of the focus lens 230 according to the near/far shift operation. Hereinafter, details of the operation of the digital camera 1 will be described.

2-2. Details of Operation

Details of the operation of the digital camera 1 that executes the near/far shift function of the present embodiment will be described with reference to FIGS. 5 to 6C. Hereinafter, the operation of the digital camera 1 in an AFS (Auto Focus Single) mode will be described as an example. The AFS mode is an operation mode that maintains a focus state obtained by once executing a focus operation that automatically detects a focus state while the release button 131 is continuously half-depressed in the auto-focus operation mode.

Figure 5:
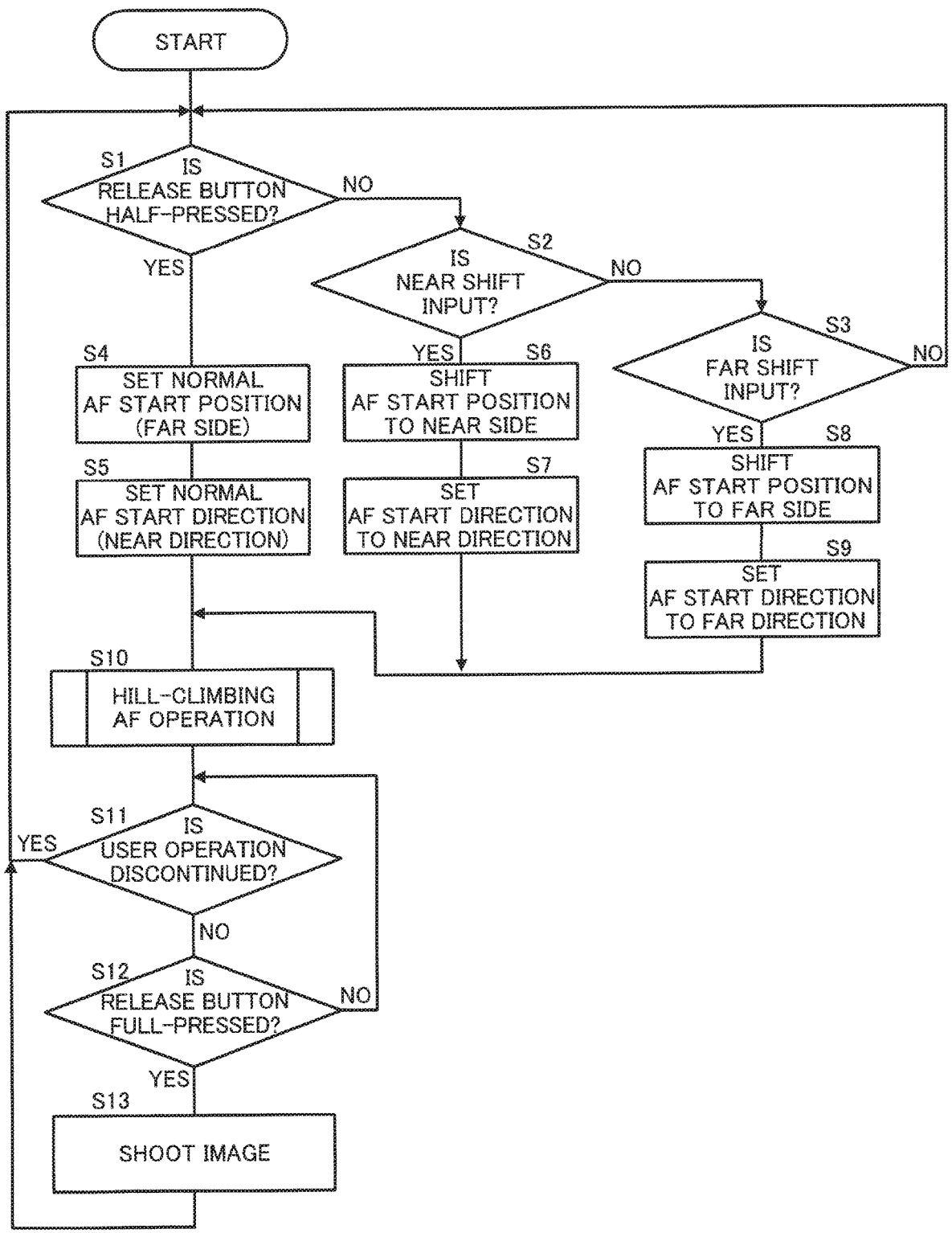
FIG. 5 is a flowchart illustrating a shooting operation of the digital camera according to the first embodiment.

FIG. 5 is a flowchart illustrating a shooting operation of the digital camera 1 according to the first embodiment. The flow shown in FIG. 5 starts when the digital camera 1 is set to the AFS mode for autofocus, for example, during the operation in the live view mode. Each process shown in the flowchart of FIG. 5 is executed by the camera controller 140, for example.

At first, the camera controller 140 determines whether or not a user operation is received based on inputs from various operation members 130 (S1 to S3). The user operations subjected to the determination include, for example, a half-depressing operation (S1) of the release button 131, a near shift operation (S2), and a far shift operation (S3). In advance, the near shift operation can be set to a depressing operation of the Fn button 136, and the far shift operation can be set to a depressing operation of another Fn button 137, for example. The camera controller 140 continues to monitor inputs from the various operation members 130 until receiving any of the above user operations (NO in S1 to S3).

When determining that the release button 131 is half-depressed (YES in S1), for example, the camera controller 140 sets an AF start position and an AF start direction for operating normal autofocus (S4, S5). In the present embodiment, a contrast method is adopted as a method of autofocus, and the focusing operation is performed by a hill-climbing AF operation (S10). An example of normal autofocus operation is illustrated in FIG. 6A.

Figure 6A:
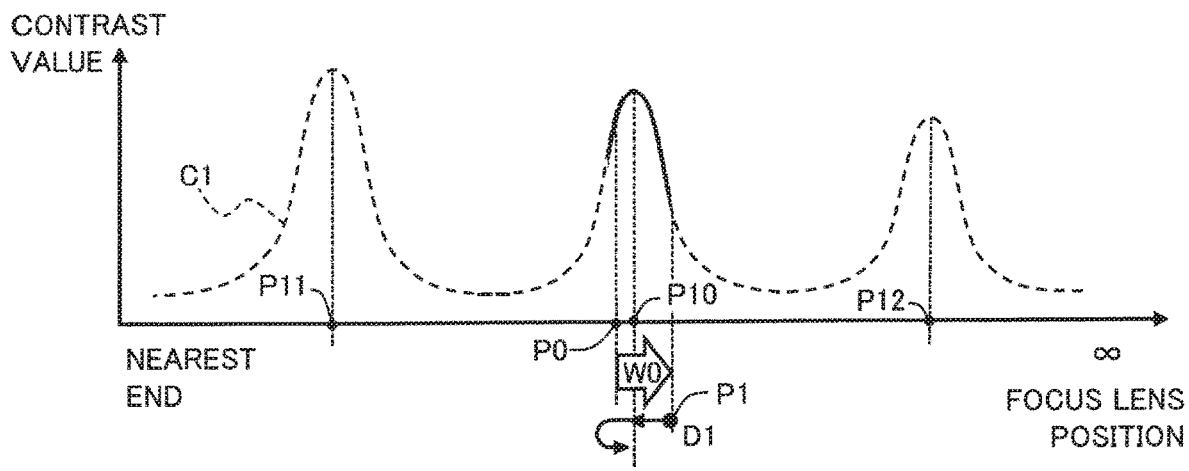
FIG. 6A is a diagram showing an example of normal autofocus operation in the digital camera.

FIG. 6A shows an example of a contrast curve C1 obtained by the hill-climbing AF operation (S10). The horizontal axis indicates a focus lens position, and the vertical axis indicates a contrast value. The focus lens position is a position along the optical axis of the focus lens 230. The contrast value is an example of an evaluation value for evaluating a focus state based on a contrast of an image. Hereinafter, in the drawing of the contrast curve C1, a portion where the contrast value is obtained by the digital camera 1 is indicated by a solid line, and a portion where the contrast value is not obtained is indicated by a broken line.

The contrast curve C1 is defined by a contrast value based on an image captured for each focus lens position. The focus lens position is defined between a nearest end where the focus is nearest for the digital camera 1 and an infinity end where the focus is farthest for the digital camera 1. Hereinafter, in directions along the optical axis, one direction toward the nearest end of the focus lens position is referred to as "near side (or near direction)", and the other direction toward the infinity end is referred to as "far side (or far direction)".

The hill-climbing AF operation (S10) performs a scanning operation to obtain a contrast value sequentially with the position of the focus lens 230 changing to the near side or the far side, and detect the peak position in the contrast curve C1 as a focus position (details will be described later). An AF start position P1 is a start position at which the focus lens 230 is positioned when the above-described scanning operation (an example of a focusing operation) is started in the hill-climbing AF operation. An AF start direction D1 is a direction in which the focus lens 230 is driven at the initial stage of the scanning operation.

The contrast curve C1 in the example of FIG. 6A has three peak positions P10, P11, and P12. At the normal autofocus, the camera controller 140 sets the AF start position P1 at a position shifted from the current position P0 of the focus lens 230 to the far side by a predetermined width W0 (S4), and sets the AF start direction D1 to the reverse direction, that is, the near direction (S5), for example. The predetermined width W0 is set to a width smaller than a presumed peak width (e.g. half-value width) from the viewpoint of causing a peak position in the vicinity of the current position P0 to be detected in the contrast curve C1, for example.

In accordance with the AF start position P1 and the AF start direction D1 set as described above, the camera controller 140 controls the hill-climbing AF operation (S10). As illustrated in FIG. 6A, the peak position P10 of the contrast curve C1 in the vicinity of the current position P0 (upon half-depressing the release button 131) of the focus lens 230 is detected as the focus position according to the normal autofocus.

On the other hand, when the user inputs a near shift operation (YES in S2), the camera controller 140 shifts the AF start position P1 to the near side (S6), and sets the AF start direction D1 to the near direction (S7). Steps S6 and S7 are processes for operating autofocus on a subject as a target that is closer than usual. An operation example in this case is illustrated in FIG. 6B.

Figure 6B:
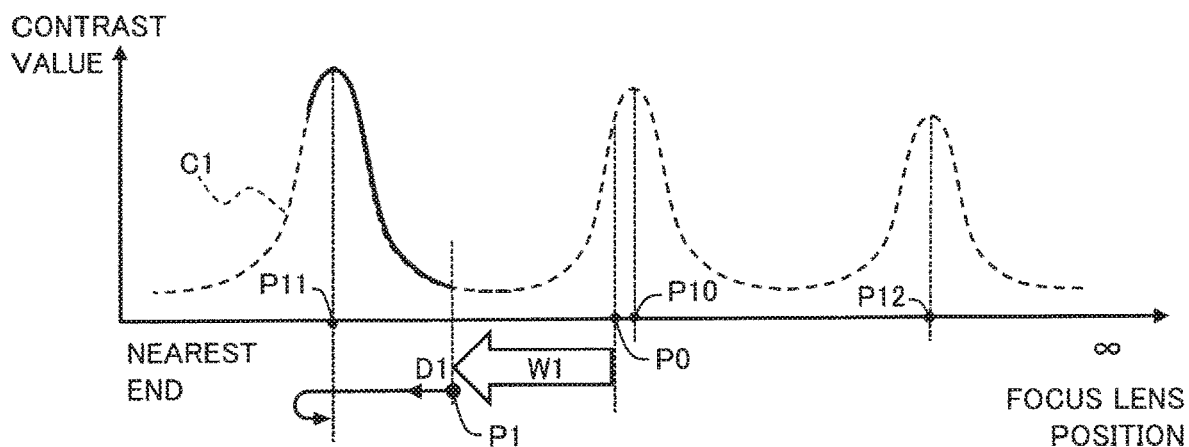
FIG. 6B is a diagram showing an example of autofocus operation using a near shift function.

The operation example of FIG. 6B illustrates a case where a near shift operation is input at the current position P0 of the focus lens 230 similar to FIG. 6A. For example, the camera controller 140 sets the AF start position P1 at a position shifted from the current position P0 of the focus lens 230 in the near direction by a shift width W1 (S7). The shift width W1 is set to a width larger than the predetermined width W0 in the normal state or the presumed peak width, from the viewpoint of causing the peak position P10 in the vicinity of the current position P0 not to be detected, for example. The shift width W1 is, for example, set to N times the depth of field (N is 50 or more, for example).

Further, the camera controller 140 sets the AF start direction D1 in the near direction same as the shifted direction (S7), and executes the hill-climbing AF operation (S10). For example, at first, the focus lens 230 moves from the current position P0 to the AF start position P1 in the near direction, as shown in FIG. 6B. In such movement, the contrast curve C1 is not particularly obtained. Thereafter, the contrast curve C1 is obtained in the scanning operation that is made to further proceed from the AF start position P1 in the near direction. Thus, the near-side peak position P11 is detected as the focus position, in the example of FIG. 6B.

When the user inputs a far shift operation (YES in S3), the camera controller 140 shifts the AF start position P1 to the far side (S8) and sets the AF start direction D1 to the far direction (S9). Steps S8 and S9 are processes for operating autofocus on a subject as a target that is farther away than usual. An operation example in this case is illustrated in FIG. 6C.

Figure 6C:
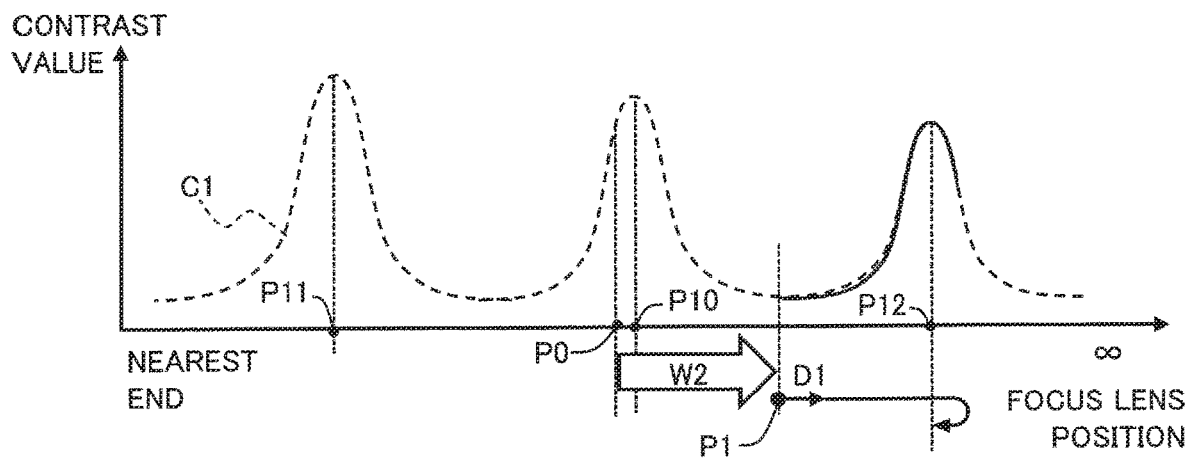
FIG. 6C is a diagram showing an example autofocus operation using a far shift function.

The operation example of FIG. 6C illustrates a case where a far shift operation is input at the current position P0 of the focus lens 230 similar to FIGS. 6A and 6B. For example, the camera controller 140 sets the AF start position P1 at a position shifted from the current position P0 of the focus lens 230 by a shift width W2 in the far direction (S8). For example, the shift width W2 of the far shift function is set in the same manner as the shift width W1 of the near shift function.

Further, the camera controller 140 sets the AF start direction D1 in the far direction same as the shifted direction (S9), and executes a hill-climbing AF operation (S10). As shown in FIG. 6C, the contrast curve C1 in this case is not particularly obtained while the focus lens 230 moves from the current position P0 in the far direction to the AF start position P1, and is obtained in the scanning operation that is started from the AF start position P1 further in the far direction. Thereby, the far-side peak position P12 is detected as the focus position, in the example of FIG. 6C.

Returning to FIG. 5, in the focus state where the focus lens 230 is in the focus position as a result of the hill-climbing AF operation (S10), the camera controller 140 determines whether or not the user operation input in steps S1 to S3 is discontinued (S11). For example, when the user operation is continued for at least one of the release button 131, the Fn button 136 for the near shift function, and the Fn button 137 for the far shift function, the process proceeds to NO in step S11.

While the user operation is continued (NO in S11), the camera controller 140 determines whether or not the release button 131 is fully depressed (S12). When the release button 131 is fully depressed (YES in S12), the camera controller 140 executes shooting an image (S13). At this time, the camera controller 140 records image data based on the imaging result of the image sensor 110 in the memory card 171. Thereafter, the camera controller 140 executes the processes after step S1 again.

On the other hand, when the release button 131 is not fully depressed (NO in S12), the camera controller 140 returns to step S11. As a result, the AFS operation is realized for maintaining the focus state obtained in the hill-climbing AF operation (S10) before step S11.

When any user operation in steps S1 to S3 is not continued (YES in S11), the camera controller 140 returns to step S1. Thereafter, when a user operation is input again (YES in S1 to S3), the process of steps S4 to S9 is performed again with the position of the focus lens 230 after step S10 as the current position, according to the input user operation.

According to the above processing, the near/far shift function can be realized for reducing or increasing the distance to a subject to be focused according to a user operation. For example, when the user in the situation of FIG. 3A inputs a near-shift operation (YES in S2), the peak position P11 that is distant from the vicinity of the current position P0 toward the near side such as the focus position of the background 52 is detected. Thereby, the focus state corresponding to desired subject 51 as illustrated in FIG. 3B is obtained. As a further example, when the user in the situation of FIG. 4A inputs a far shift operation (YES in S3), the peak position P12 that is distant from the obstacle 53 toward the far side is detected, and the desired focus state as illustrated in FIG. 4B is obtained.

The near/far shift operation as described above can be input a plurality of times, for example, by repeatedly depressing and releasing the Fn buttons 136 and 137 (S2, S3, S11). Accordingly, even when there are many peak positions P10 to P12 in the contrast curve C1, it is possible to selectively focus on the peak position desired by the user by repeating the near/far shift operation. In this case, by making the shift widths W1 and W2 different for example, it is possible to easily reach the desired peak position by the above-described user operation.

2-3. Hill Climbing AF Operation

Details of the hill-climbing AF operation (S10 in FIG. 5) will be described with reference to FIG. 7.

Figure 7:
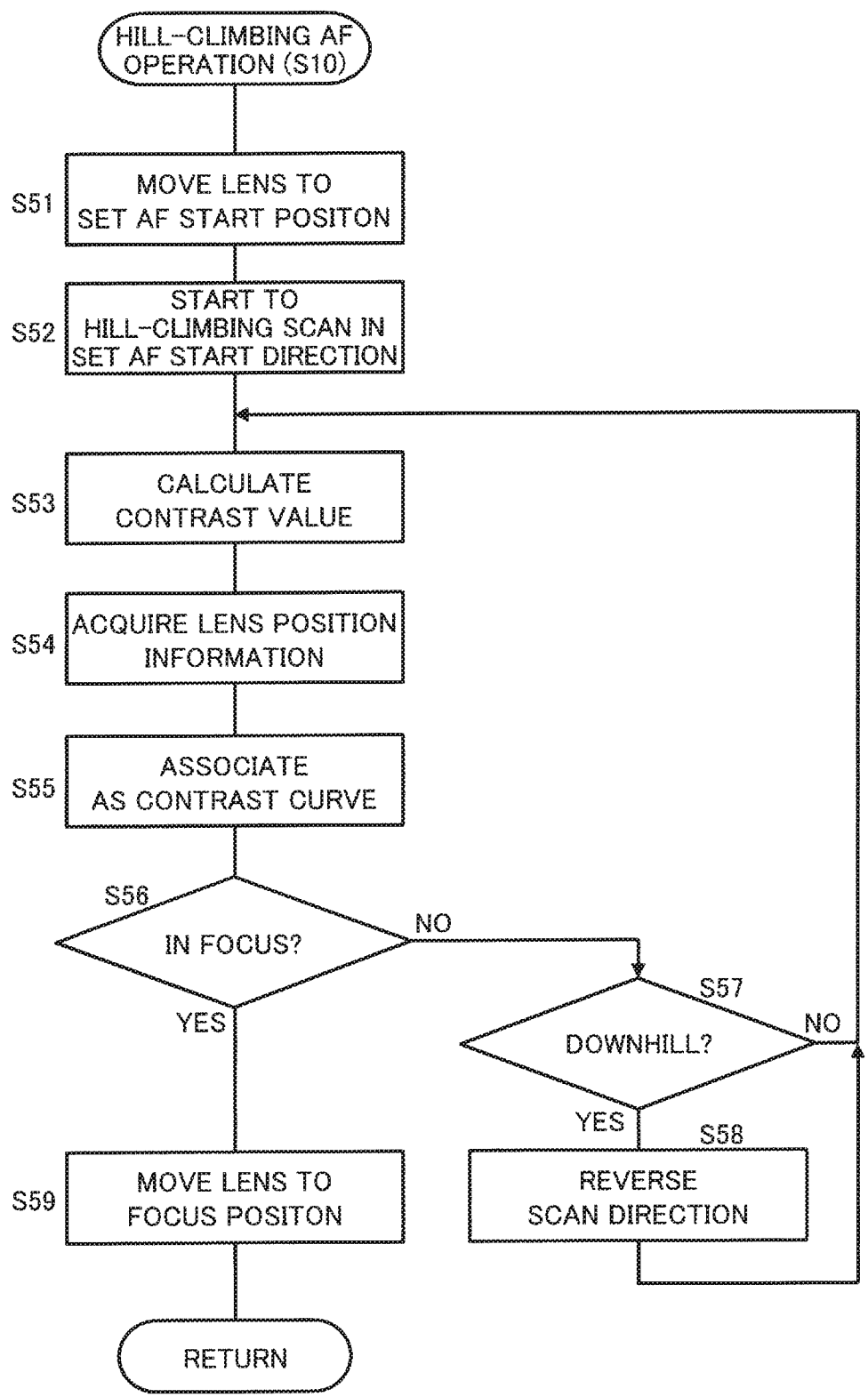
FIG. 7 is a flowchart illustrating a hill-climbing AF operation in the digital camera.

FIG. 7 is a flowchart illustrating the hill-climbing AF operation in the digital camera 1. The processing shown in the flowchart of FIG. 7 is executed in a state where the AF start position and the AF start direction D1 are set (S4 to S6) according to the user operation received in any of steps S1 to S3 of FIG. 5.

At first, the camera controller 140 transmits a command for moving the focus lens 230 to the set AF start position P1 to the lens controller 240 (S51). The lens controller 240 controls the focus lens driver 233 according to the received command, and moves the focus lens 230 from the current position P0 to the AF start position P1. For example, when a near/far shift operation is input (S2, S3 in FIG. 5), the focus lens driver 233 drives the focus lens 230 in the near/far direction by a shift width W1, W2 which is larger than the predetermined width W0 in the normal state, respectively.

The camera controller 140 transmits a command based on the set AF start direction D1 to the lens controller 240 to start a scanning operation in the hill-climbing AF operation (S52). After the focus lens 230 reaches the AF start position P1, the lens controller 240 changes the control method of the focus lens driver 233 to the control method for the scanning operation, and gradually (for example, with a predetermined pitch width) advances the focus lens 230 in the AF start direction D1 indicated by the received command.

During the scanning operation started from step S52, the camera controller 140 continues to transmit an exposure synchronization signal to the lens controller 240 and the like. The lens controller 240 stores, in the RAM 241, lens position information indicating the current position of the focus lens 230 at the time according to the signal in association with the exposure synchronization signal. The image sensor 110 is exposed during the exposure period and sequentially outputs the generated image data to the camera controller 140 via the AD converter 111.

The camera controller 140 calculates a contrast value based on the image data from the image sensor 110 (S53). Specifically, the camera controller 140 obtains a luminance signal from one frame of image data, integrates high-frequency components in the screen of the luminance signal, and obtains the contrast value. The contrast value thus calculated is stored in the RAM 141 in a state associated with the exposure synchronization signal. The spatial frequency band of the high frequency used for calculating the contrast value is set appropriately, for example, from the viewpoints of sharpening the peak portion in the contrast curve C1, avoiding the influence of noise, and the like.

Further, the camera controller 140 requests lens position information from the lens controller 240, and acquires lens position information stored in the RAM 241 from the lens controller 240 (S54). In the present embodiment, every time the image sensor 110 captures an image for one frame, the camera controller 140 transmits a request for lens position information.

Next, the camera controller 140 associates the contrast value stored in the RAM 141 with the acquired lens position information (S55), to store in the RAM 141 as information indicating the contrast curve C1. Since the contrast value and the lens position information are associated with each other in the exposure synchronization signal, the camera controller 140 can store the contrast value in association with the lens position information.

Based on the information of the contrast curve C1 obtained by the association as described above, the camera controller 140 determines whether or not the focus position of the focus lens 230 is detected (S56). The determination in step S56 is made according to whether or not the lens position at which the contrast curve C1 has a peak value, that is, a maximum value has been extracted.

When the focus position of the focus lens 230 is not detected (NO in S56), the camera controller 140 and the lens controller 240 repeat the processing after step S53 and continue the scanning operation. At this time, the advancing direction of the scanning operation for advancing the focus lens 230 is determined, for example, according to the gradient of the contrast curve C1 (S57, S58).

For example, the camera controller 140 determines whether or not the gradient in the vicinity of the current position of the focus lens 230 steeply descends lower than a predetermined threshold value in the current advancing direction (S57). The threshold value is set in consideration of, for example, a presumed downhill for a peak portion. When the contrast curve C1 steeply descends (YES in S57), the camera controller 140 reverses the advancing direction of the scanning operation (S58). When the contrast curve C1 does not particularly descend (NO in S57), the camera controller 140 does not change the advancing direction and returns to step S53.

On the other hand, when the focus position of the focus lens 230 is detected (YES in S56), the camera controller 140 transmits a command to the lens controller 240 so as to move the focus lens 230 to the detected focus position (S59). The lens controller 240 controls the focus lens driver 233 according to the received command, and moves the focus dens 230 to the focus position.

When the movement of the focus lens 230 to the focus position is completed (S59), the camera controller 140 ends the hill-climbing AF operation (S10 in FIG. 5), and proceeds to step S11.

According to the above hill-climbing AF operation, for setting of the normal autofocus for example (S4, S5 in FIG. 5), the focus lens 230 is moved to the AF start position P1 (S51), and then the scanning operation is started in the direction opposite to the moved direction (S52). As a result, the focus lens position is adjusted so as to focus on the subject at the peak position P10 in the vicinity of the current position P0 of the focus lens 230 (see FIG. 6A).

On the other hand, by using the near/far shift function (S6 to S9 in FIG. 5), the focus lens 230 is moved to the AF start position P1 shifted in the near direction or the far direction (S51), and then the scanning operation is started in the same direction as the shifted direction (S52). As a result, the focus lens position is adjusted so as to focus on the subjects at the peak positions P11 and P12 that are distant from the current position P0 of the focus lens 230 in the near/far direction (see FIGS. 6B and 6C). At this time, the AF start position P1 after the shift may exceed the focus position of the desired subject. As an example in this regard, an operation example using the near shift function will be described with reference to FIG. 8.

Figure 8:
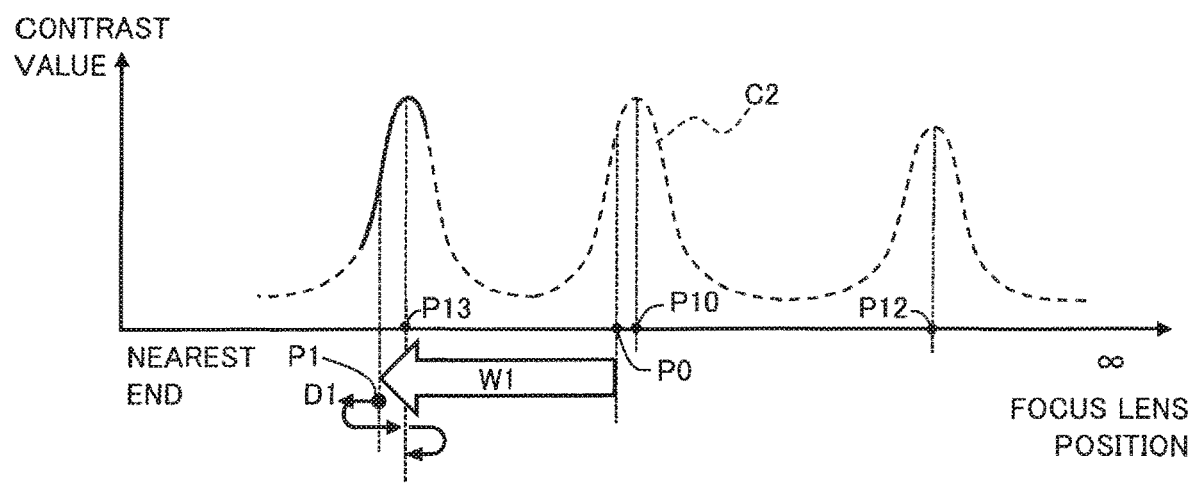
FIG. 8 is a diagram showing another example of the autofocus operation using the near shift function.

In the example of FIG. 8, the AF start position P1 after the shift by the near shift function is closer to the near side than the peak position P13 corresponding to the desired subject on a contrast curve C2. In this case, the hill-climbing AF operation starts the scanning operation in the near direction (S52), and then the advancing direction of the scanning operation is reversed according to the descending gradient of the contrast curve C2 (S57, S58). Thereafter, the peak position P13 can be detected while the scanning operation advances in the far direction. As described above, the near/far shift function enables to focus on a desired subject, even when the AF start position P1 after the shift exceeds the focus position of the desired subject.

Such a near/far shift function can be easily realized by using shift widths W1 and W2 that are large enough to deviate from the range of the peak portion (i.e. the peak width) in the vicinity of the current position P0 on the contrast curve C2. Here, while the height of the peak portion (i.e. the contrast value at the peak position) in the contrast curve C2 is considered to vary depending on the type of subject, the peak width can be estimated by the depth of field or the like without particularly depending on the type of subject. Therefore, the shift widths W1 and W2 can be set based on such information appropriately. The shift widths W1 and W2 can be set to a width that is at least larger than the pitch width of the scanning operation.

For example, the shift widths W1 and W2 are set larger than the depth of field when the near/far shift function is used, such as set within a range of 10 to 100 times the depth of field. For example, the camera controller 140 can acquire data indicating the state of the interchangeable lens 200 such as an aperture value and a focal length from the lens controller 240, and can calculate the shift widths W1 and W2 according to the depth of field as needed.

3. Summary

As described above, each of the digital camera 1 and the camera body 100 in the present embodiment is an example of an imaging apparatus, and includes the image sensor 110 as an example of an imager and the camera controller 140 as an example of a controller. The image sensor 110 is configured to capture a subject image formed via the interchangeable lens 200, which is an example of an optical system including the focus lens 230, to generate image data. The camera controller 140 is configured to control a focusing operation for adjusting the position of the focus lens 230 along the optical axis in the optical system according to the evaluation value for the focus state. In response to an instruction to reduce or increase the distance to a subject to be focused (S2, S3), the camera controller 140 is operable to shift the AF start position P1 to a direction according to the instruction in directions along the optical axis, the AF start position P1 being a position of the focus lens 230 for starting the focusing operation (S6, S8). The camera controller 140 is operable to start the focusing operation from the AF start position P1 after the shift (S10).

According to the above imaging apparatus, it can easily make the focus position, which is in the vicinity of the focus lens 230 before the shift, not to be detected in the focusing operation. Therefore, even in a situation where there is a background 52, an obstacle 53, or the like that could be an obstacle to focusing on the desired subject 51, it enables to easily focus on the desired subject 51 based on the above instruction.

In the present embodiment, when the AF start position P1 is shifted (S6, S8), the camera controller 140 may start the focusing operation in the same direction as the direction of the shift from the AF start position P1 after the shift (S7, S9). In this way, by directing the AF start direction D1 to the shifted direction, it is possible to easily focus on the desired subject 51 on the near side or the far side.

In this embodiment, the scanning operation of the hill-climbing AF operation, which is an example of the focusing operation, moves the focus lens 230 sequentially, and calculates the evaluation value based on the image data generated by the image sensor 110 in each position of the focus lens 230 (S53). Upon the shift of the AF start position P1, the camera controller 140 is operable to start a focusing operation to advance the focus lens 230 in the same direction as the direction of the shift (S52). According to such an imaging apparatus, after the AF start position P1 is shifted, the scanning operation advances in the shifted direction. Thus, it is facilitated to detect the focus position located in the shifted direction from the vicinity of the focus lens 230 before the shift.

In the present embodiment, the evaluation value is a contrast value for image data in each position of the focus lens 230. Autofocus of a contrast method can be performed by a scanning operation using the contrast value as an evaluation value.

In this embodiment, in response to an instruction to use the near/far shift function as described above (YES in S2, S3), the camera controller 140 is operable to move the focus lens 230 from the current position P0 to the start position P1 by the shift width W1, W2 (S6, S8, S51). The shift width W1, W2 is larger than a width by which the focus lens 230 moves in the normal focusing operation (S4, S5, S10) that is executed without the instruction in steps S2, S3, for example, with the release button 131 half-depressed (YES in S1). The width may be, for example, a predetermined width W0 in which the normal AF start position P1 is set, or a pitch width of the scanning operation. By setting the shift width W1, W2 to be relatively large, it is easy to change the distance to the subject to be focused.

The imaging apparatus according to the present embodiment further includes an operation member 130 configured to receive a user operation in response to an instruction by a user operation on the operation member 130 (S2, S3), the camera controller 140 is operable to shift the AF start position P1 and start a focusing operation (S6 to S9). It can facilitate to achieve focusing on the subject according to the user's intention by the near shift operation or the far shift operation by the user operation.

In the present embodiment, in response to the near shift operation which is an example of an instruction to reduce the distance to a subject to be focused (YES in S2), the camera controller 140 is operable to shift the AF start position P1 in the direction toward the nearest end, that is, to the near side in the optical system such as the interchangeable lens 200 (S6). Thereafter, the focusing operation is started in the same near direction as the shifted direction, and it is possible to easily focus on a relatively close subject.

In this embodiment, in response to the far shift operation, which is an example of an instruction to increase the distance to a subject to be focused (YES in S3), the camera controller 140 is operable to shift the AF start position P1 in the direction toward the infinity end, that is, to the far side in the same optical system (S8). Thereafter, the focusing operation is started in the same far direction as the shifted direction, and it is possible to easily focus on a relatively far subject.

Second Embodiment

In the first embodiment, the operation example of the digital camera 1 that applies the near/far shift function to the AFS mode has been described. In the second embodiment, an example in which the near/far shift function is applied to another operation mode will be described.

Hereinafter, the description of the similar configuration and operation to the digital camera 1 according to the first embodiment will be omitted as appropriate, and the digital camera 1 according to the present embodiment will be described.

Figure 9:
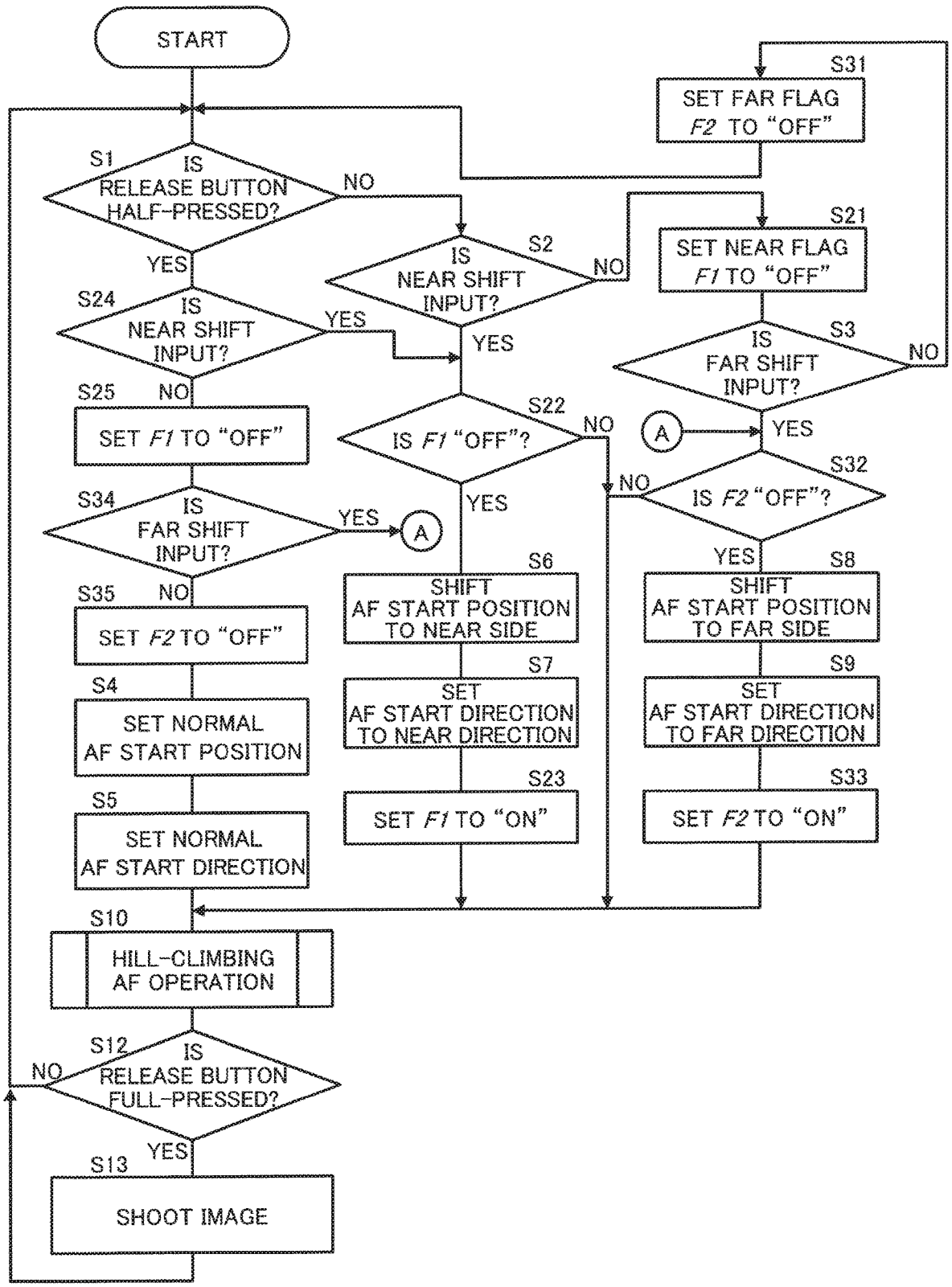
FIG. 9 is a flowchart illustrating a shooting operation of a digital camera according to a second embodiment.

FIG. 9 is a flowchart illustrating a shooting operation of the digital camera 1 according to the second embodiment. Hereinafter, the operation of the digital camera 1 in an AFC (Auto Focus Continuous) mode will be described as an example. The AFC mode is an operation mode in which the focusing operation is repeatedly executed with the focus state continuously updated while the release button 131 is continuously half-depressed.

In the operation example shown in FIG. 9, the camera controller 140 performs the processes of steps S1 to S10 and S12 as in the first embodiment. In this case, when the camera controller 140 determines that the release button 131 is not fully depressed (NO in S12), the process after step S1 is executed again. Thus, while the release button 131 is half-depressed (YES in S1), the focusing operation in step S10 is repeatedly executed, and thus the operation in the AFC mode is realized.

In this operation example, the camera controller 140 performs processing using a near flag F1 and a far flag F2 instead of step S11 in FIG. 5 (S21 to S25, S31 to S35). The near flag F1 and the far flag F2 are flags for managing the states of the near/far shift functions by ON/OFF, respectively, and are stored in the RAM 141.

For example, when the near shift operation is not input (NO in S2), the near flag F1 is set to "OFF" (S21). When it is determined that a near shift operation is input (YES in S2), the camera controller 140 determines whether or not the near flag F1 is "OFF" (S22).

When the near flag F1 is "OFF" (YES in S22), the camera controller 140 performs setting for the near shift function (S6, S7). Thereafter, the camera controller 140 sets the near flag F1 to "ON" (S23), and proceeds to step S10.

On the other hand, when the near flag F1 is "ON" (NO in S22), the camera controller 140 proceeds to step S10 without performing the processes of steps S6, S7, and S23.

In addition, even in a state that the release button 131 is half-depressed (YES in S1), the camera controller 140 determines, as in step S21, whether or not a near-shift operation is input (S24). Also at this time, when the near shift operation is not input (NO in S24), the camera controller 140 sets the near flag F1 to "OFF" (S25). Further, when the near shift operation is input (YES in S24), the camera controller 140 proceeds to the determination in step S22.

As described above, according to the processing (S21 to S25) which uses the near flag F1, the focusing operation by the near shift function is executed as many times as inputs of the near shift operation. In this operation example, when the depressing operation of the Fn button 136 of the near shift function is continued, the focusing operation by the near shift function is performed once, and then the normal focusing operation is repeated.

Regarding the far shift function, the camera controller 140 uses the far flag F2 instead of the near flag F1, and performs the same processing as steps S21 to S25 according to the far shift operation (S31 to S35). Accordingly, also with respect to the far shift function, the focusing operation by this function is executed as many times as inputs of the far shift operation.

Although the operation example in the AFC mode has been described above, the near/far shift function can be applied also to various other operation modes. For example, by performing the same processing as in FIG. 9 in a continuous shooting AF operation mode in which still images are shot continuously, the near/far shift function can be applied to continuous shooting AF. Further, the near/far shift function can be applied in the same manner as described above not only for still images but also when the digital camera 1 operates to capture a moving image.

As described above, in the present embodiment, in response to an instruction to use the near/far shift function given during execution of various operations that continuously repeat the focusing operation (S24, S34), the camera controller 140 is operable to shift the AF start position P1 (S6, S7) and perform the focusing operation again (S10). Accordingly, it is possible to easily focus on a desired subject even during various operations for continuously performing the focusing operation.

OTHER EMBODIMENTS

As described above, the first and second embodiments have been described as examples of the technology disclosed in the present application. However, the technology in the present disclosure is not limited to this, and can also be applied to embodiments in which changes, substitutions, additions, omissions, and the like have been made as appropriate. Further, it is also possible to combine the components described in the embodiment to form a new embodiment. Accordingly, other embodiments will be exemplified below.

In the first and second embodiments, the example of employing autofocus of a contrast method has been described. However, the present disclosure is not limited to the contrast method, and can be applied to various autofocus techniques. A modification of the focusing operation in the digital camera 1 will be described with reference to FIG. 10.

Figure 10:
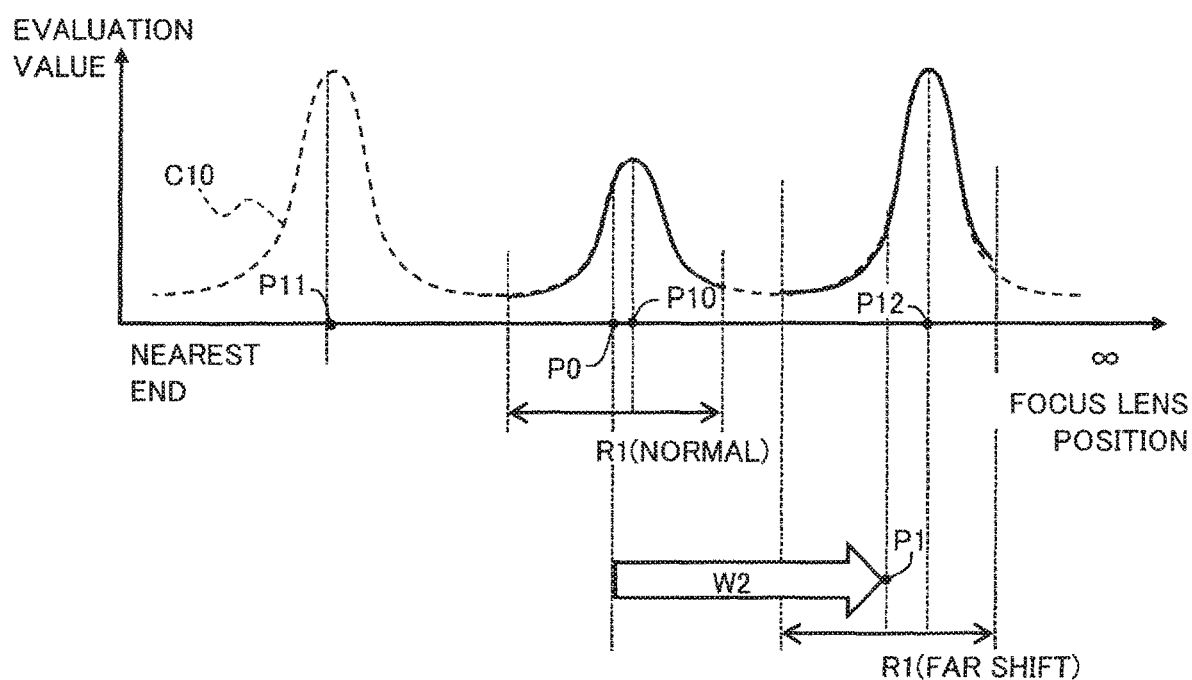
FIG. 10 is a diagram for explaining a modification of the focusing operation in the digital camera.

FIG. 10 illustrates a characteristic curve C10 in a focusing operation of the modification. The characteristic curve C10 is a curve defined by an evaluation value obtained in a focusing operation instead of the contrast method, such as an image plane phase difference method. The horizontal axis represents a focus lens position, and the vertical axis represents an evaluation value for evaluating a focus state instead of a contrast value. The evaluation value indicates, for example, the degree of coincidence among outputs of phase difference sensors in the image plane phase difference method. The phase difference sensors are provided by being incorporated in the image sensor 110, for example.

FIG. 10 shows how the characteristic curve C10 within a detection range R1 including the current position P0 of the focus lens 230 is obtained. The detection range R1 is defined by the characteristics of the interchangeable lens 200, for example, and includes a near side range and a far side range with the current position P0 as a reference.

In the focusing operations such as the image plane phase difference method, the camera controller 140 of the digital camera 1 calculates an evaluation value for each focus position in the detection range R1 comprehensively, without moving the focus lens 230 from the current position P0. The camera controller 140 can detect the peak position P10 within the detection range R1 as the focus position based on the calculated evaluation value. In this case, the focus lens 230 can be driven at once to the detected focus position.

On the other hand, it is considered that the peak positions P11 and P12 existing outside the detection range R1 cannot be detected in the normal focusing operation as described above. Then, the present embodiment enables such peak positions P11 and P12 to be detected by the same near/far shift function as in the first and second embodiments.

In FIG. 10, the detection result of the focusing operation using the far shift function is also shown in addition to the detection result of the normal focusing operation. When a far shift operation is input in this embodiment for example, as in the first and second embodiments, the camera controller 140 moves the focus lens 230 to the AF start position P1 shifted from the current position P0 of the focus lens 230 to the far side, and executes the focusing operation similar to the normal operation from the AF start position P1. As a result, an evaluation value within the detection range R1 including the AF start position P1 as a reference is obtained as shown in FIG. 10, and the far-side peak position P12 can be detected.

The operation of the modification as described above, also for the near shift function, can be performed in the same manner as the far shift function by shifting the AF start position P1 to the near side. The present modification is not particularly limited to the image plane phase difference method, and can be applied also to a phase difference method or DFD (Depth From Defocus). For example, the evaluation value may be a cost value for DFD.

In each of the above embodiments, the depressing operation of the Fn buttons 136 and 137 is illustrated as an example of the near/far shift operation. The near/far shift operation is not particularly limited to this, and may be various user operations. For example, the near/far shift operation may be a double click, simultaneous pressing, long pressing, or the like on the various buttons on the operation member 130. The near/far shift operation may be a combination of a half-depressing operation of the release button 131 and an operation such as an MF ring or a dial. Further, in the menu setup, the half-depressing operation of the release button 131 may be set to either the near shift operation or the far shift operation, for example.

In each of the above embodiments, the instruction for using the near/far shift function is given by a user operation. However, the instruction is not limited to the user operation, and may be given by, for example, autonomous determination in the digital camera 1. For example, when a through image as shown in FIG. 4A is obtained, the camera controller 140 detects that the focus is on a specific obstacle 53 such as a fence by image recognition, and it can be an autonomous instruction to use a far shift function. Such image recognition can be easily realized by machine learning, for example. Alternatively, the digital camera 1 may store, in a flash memory 142 or the like, a user operation log such as a history of using the near/far shift operation previously, and autonomously instruct the near/far shift function based on the operation log.

In each of the above embodiments, an example in which both the near shift function and the far shift function are realized has been described. In the digital camera 1 of the present embodiment, one of the near shift function and the far shift function may be implemented. This also facilitates focusing on the subject 51 desired by the user under the situation as shown in FIG. 3A or FIG. 4A.

In each of the above embodiments, the lens-interchangeable digital camera has been described as an example of the imaging apparatus. However, the imaging apparatus of the present embodiment may be a digital camera that is not particularly an interchangeable lens type. The idea of the present disclosure can be applied not only to a digital camera but also to a movie camera, and an electronic device having various imaging functions such as a mobile phone or a PC with a camera.

As described above, the embodiments have been described as examples of the technology in the present disclosure. For this purpose, the accompanying drawings and detailed description are provided.

Accordingly, among the components described in the accompanying drawings and the detailed description, not only the components essential for solving the problem, but also the components not essential for solving the problem may also be included in order to illustrate the above technique. Therefore, it should not be immediately recognized that these non-essential components are essential as those non-essential components are described in the accompanying drawings and detailed description.

Moreover, since the above-mentioned embodiments are for demonstrating the technique in the present disclosure, various changes, substitutions, additions, omissions, etc. can be performed in a claim or its equivalent range.

INDUSTRIAL APPLICABILITY

The present disclosure can be applied to various imaging apparatuses that perform a focusing operation.

The invention claimed is:

1. An imaging apparatus, comprising:
   an imager configured to capture a subject image formed via an optical system including a focus lens, to generate image data; and
   a controller configured to control a focusing operation for adjusting a position of the focus lens along an optical axis in the optical system according to an evaluation value for a focus state, wherein
   in response to a user instruction to reduce or increase a distance to a subject to be focused, the controller is operable to:
   shift a start position by a predetermined shift width from a present position of the focus lens to a direction according to the user instruction in directions along the optical axis, the shift width being a constant set prior to the user instruction, the start position being a position of the focus lens for starting the focusing operation, and
   start the focusing operation from the start position after the shift.

2. The imaging apparatus according to claim 1, wherein the focusing operation sequentially moves the focus lens, and calculates the evaluation value based on image data generated by the imager in each position of the focus lens, wherein upon the shift of the start position, the controller is operable to start the focusing operation to advance the focus lens in the same direction as the direction of the shift.

3. The imaging apparatus according to claim 2, wherein the evaluation value is a contrast value for image data in each position of the focus lens.

4. The imaging apparatus according to claim 1, wherein the shift width is larger than a width by which the focus lens moves in a focusing operation that is executed without the user instruction.

5. The imaging apparatus according to claim 1, further comprising an operation member configured to receive a user operation, wherein
   the controller is operable to shift the start position and start the focusing operation in response to the user instruction input by a user operation on the operation member.

6. The imaging apparatus according to claim 1, wherein the controller is operable to shift the start position in a direction toward a nearest end in the optical system in response to a user instruction to reduce the subject distance to be focused.

7. The imaging apparatus according to claim 1, wherein the controller is operable to shift the start position in a direction toward an infinity end in the optical system in response to a user instruction to increase the subject distance to be focused.

8. The imaging apparatus according to claim 1, wherein in response to the user instruction given during an operation of continuously repeating the focusing operation, the controller is operable to shift the start position and perform the focusing operation again.

9. The imaging apparatus according to claim 1, wherein the shifted start position is a position of the focus lens for starting the focusing operation where a focus position has not yet been calculated.

10. The imaging apparatus according to claim 1, wherein the shift width is set to a width larger than a presumed peak width or a predetermined width applied to detect a peak position nearest of the present position, thus causing the peak position nearest of the present position not to be detected.

* * * * *